Oct. 19, 1965    J. A. WAGLE    3,212,664
WELD REINFORCEMENTS
Filed April 23, 1963

INVENTOR.
Joseph A. Wagle
BY
Paul Fitzpatrick
ATTORNEY

United States Patent Office 3,212,664
Patented Oct. 19, 1965

3,212,664
WELD REINFORCEMENTS
Joseph Albert Wagle, New Augusta, Ind., assignor to General Motors Corporation, Detroit, Mich., a corporation of Delaware
Filed Apr. 23, 1963, Ser. No. 275,122
2 Claims. (Cl. 220—3)

My invention relates to metallic pressure vessels, more particularly to cylindrical pressure vessels such as solid propellant rocket engine cases, and yet more particularly to reinforcements for weld joints in cylinder sections of such units.

The invention is a solution to the problem of economical construction of reliable ultra-high strength all metallic cylinder sections of solid propellent rocket cases. Current reliable metallic high strength rocket engine case cylinders are fabricated from ring forgings. This is done to eliminate the critical longitudinal welds that would result from the more economically formed sheet metal fabrication method. This invention, in its preferred embodiment, provides reliable, yet economical, ultra-high strength rocket engine cases by utilizing a sheet metal formed and welded cylinder, reinforced with glass filament wrappings and arcuate steel plates, to eliminate the critical nature of the longitudinal weld. The ultimate strength to density ratio of this metallic-filament wrap composite construction can be significantly greater than that of a case made of all metal.

Therefore, it is object of this invention to provide a metallic pressure vessel which can be used as a rocket engine case section, and which is more economical and involves less weight than previous such case sections.

It is a further object of the subject invention to combine the best features of steel cases and filament cases to provide an extremely strong rocket case section.

Other objects, features and advantages of the subject invention will become apparent upon reference to the succeeding detailed description of the drawings showing the preferred embodiment thereof, wherein.

Figure 1:
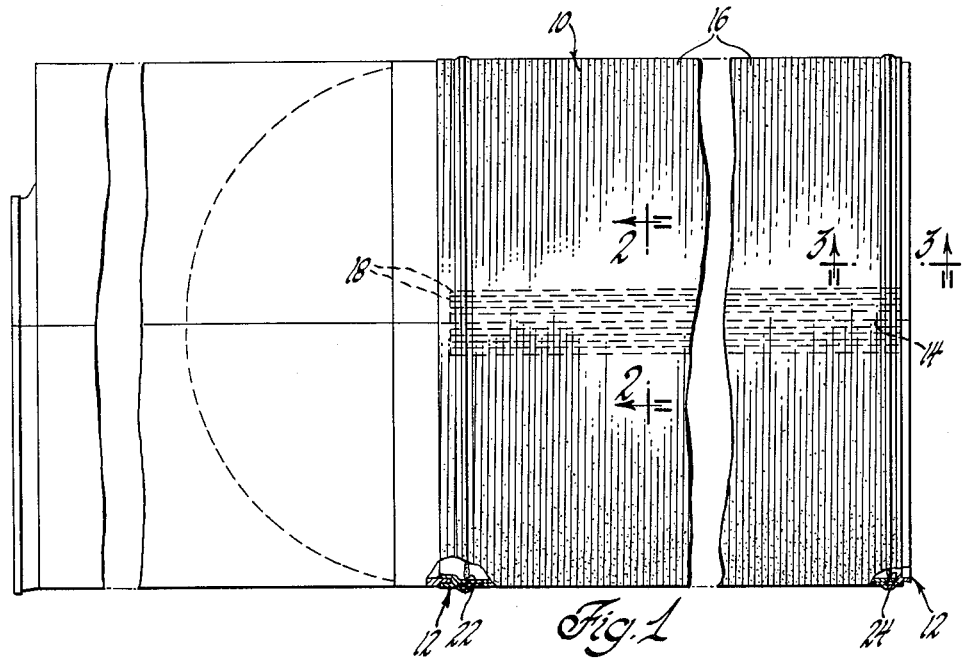
FIGURE 1 is a view of the rocket engine case section with parts cut away.

More particularly, FIGURE 1 shows a rocket engine case section 10 which is adapted to connect to other similar case sections to form a complete rocket engine structure. The case section 10 will be connected to an adjacent case section by any suitable means such as the tongue and groove device 12. The case section 10 will be formed by a sheet of steel which is formed to the required length and thickness and joined together at a longitudinal seam 14.

Figure 2:
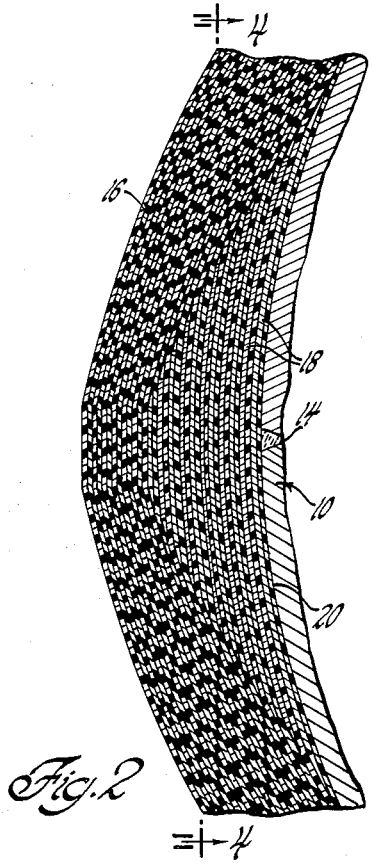
FIGURE 2 is a sectional view of the longitudinal weld reinforcements taken in the direction of arrows 2—2 in FIGURE 1.

This longitudinal seam will be reinforced as shown in FIGURE 2. This reinforcement will be comprised of a plurality of layers of resin reinforced glass filament tape 16, the first few of which alternate with arcuate steel plates 18. As shown in FIGURE 2 the first layer 20 of the glass filament 16 is wrapped adjacent to the rocket engine case section 10. Located directly adjacent to the first layer 20 of glass filament 16 is the first arcuate steel plate 18. This alternating pattern of glass filament wrapping and arcuate steel plates continues until the required number of layers needed for strength purposes have been used. In the illustrated embodiment, these arcuate plates are made of a stainless steel and eleven of them are alternated with layers of the glass filament tape. A plurality of layers of glass filament 16 are wrapped consecutively around the previously discussed alternating layers. The number of these layers used will again be a function of the strength required and the thickness of the glass filament wrapping. The illustrated number of layers in this section is 25.

Figure 3:
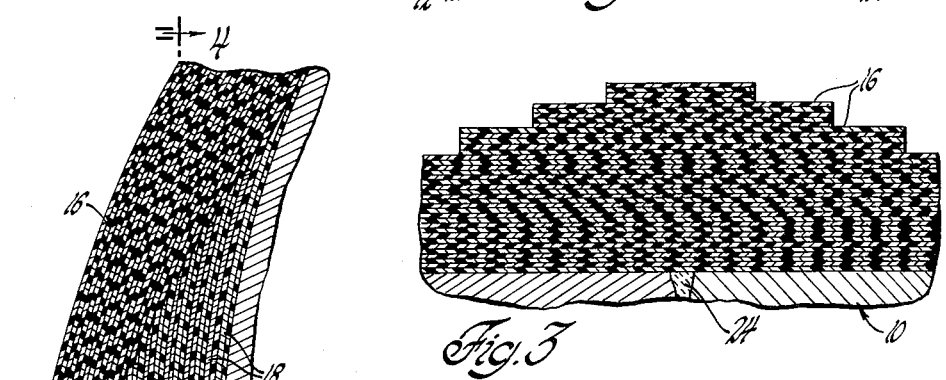
FIGURE 3 is a sectional view of the circumferential weld reinforcements taken in the direction of arrows 3—3 in FIGURE 1.

The connecting means 12 located at both ends of the rocket case section 10 are joined to the rocket case section 10 by means of circumferential welds which are located at 22 and 24. An enlarged view of the reinforcements for the circumferential welds 22 and 24 is provided in FIGURE 3. These reinforcements consist of a plurality of layers of the aforementioned resin reinforced glass filament wrapping, with the thickness of the wrapping built-up directly over the weld portion 22 or 24. Again the thickness of the glass filament wrapping will depend upon the strength required and the thickness in each individual layer of glass filament and a suggested number would be in the range of one hundred.

Figure 4:
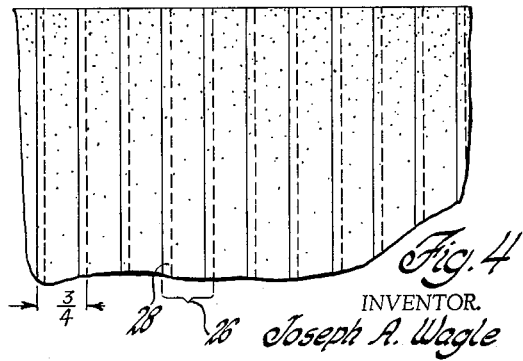
FIGURE 4 is a view of the resin reinforced glass filament wrap pattern as seen in the direction of arrows 4—4 in FIGURE 2.

A suggested wrap pattern is shown in FIGURE 4. This pattern, of course, will depend upon the width of the glass filament tape used and upon the overlap desired. The pattern suggested involves the use of a resin reinforced glass filament tape ¾" wide, and an overlap such that each tape overlaps the adjacent tape by an ⅛". The width of one section is shown schematically at 26, and the overlap is that which is shown at 28.

Thus, it is seen that the invention, in its preferred embodiment comprises a sheet metal formed and welded cylinder, reinforced with filament wrappings and arcuate steel plates in the area of its weld to eliminate the critical nature of this longitudinal weld. The invention further may include a wrap pattern for reinforcing the circumferential welds used to join connecting means to this steel cylinder. Therefore, this invention is an improvement over current metallic pressure vessels because it is more economical and it involves less weight for the same mission.

Although the subject invention has been illustrated in connection with its use as a rocket engine case cylinder, it should be obvious to those skilled in the art to which the invention pertains that it would have use in any application where a strong cylindrical pressure vessel is desired, and that many changes and modifications may be made thereto without departing from the scope of the invention.

I claim:
1. A cylindrical pressure vessel comprising:
    a metal case section joined in the longitudinal direction;
    a plurality of discrete arcuate metal plates positioned over said longitudinal seam to form a portion of a reinforcement for said longitudinal seam, said plates progressively outwardly diminishing in cirumferential length;
    and a plurailty of layers of high strength resin reinforced glass filament tape circumferentially wrapping said case section, several layers of said filament tape alternating with said discrete arcuate metal plates over said longitudinal seam, and the remaining layers of said filament tape being wrapped consecutively over said alternated layers of said discrete arcuate metal plates and said filament tape.
2. A rocket engine case comprising:
    a metal case section joined in the longitudinal direction;
    a connecting means joined circumferentially to said case section providing the means by which said case section can be attached to an adjacent case section;
    a plurality of discrete arcuate metal plates positioned over said longitudinal seam to form a portion of a reinforcement for said longitudinal seam, said plates progressively outwardly diminishing in circumferential length;

and a plurality of layers of high strength resin reinforced glass filament tape circumferentially wrapping said case section, several layers of said filament tape alternating with said discrete arcuate metal plates over said longitudinal seam, the remaining layers of said filament tape being wrapped consecutively over said alternated layers of said discrete arcuate metal plates and said filament tape, and all of said layers of filament tape being wrapped consectively over said circumferential seam where said connecting means are joined to said case section.

References Cited by the Examiner
UNITED STATES PATENTS

| | | | |
|---|---|---|---|
| 2,814,313 | 11/57 | Tate. | |
| 2,924,546 | 2/60 | Shaw | 156—192 |
| 2,982,457 | 5/61 | D'Alelio | 220—83 |
| 3,131,725 | 5/64 | Chyle | 220—3 |

THERON E. CONDON, *Primary Examiner.*

GEORGE O. RALSTON, *Examiner.*